(12) United States Patent
Mikolajczyk et al.

(10) Patent No.: US 12,375,529 B2
(45) Date of Patent: Jul. 29, 2025

(54) SYSTEMS AND METHODS FOR SCHEDULED POLICY DEPLOYMENT IN OPERATIONAL TECHNOLOGY NETWORKS

(71) Applicant: Rockwell Automation Technologies, Inc., Mayfield Heights, OH (US)

(72) Inventors: Roch Mikolajczyk, Katowice (PL); Jack M. Visoky, Willoughby, OH (US); Taryl J. Jasper, Concord Township, OH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 226 days.

(21) Appl. No.: 18/113,491

(22) Filed: Feb. 23, 2023

(65) Prior Publication Data

US 2024/0291865 A1 Aug. 29, 2024

(51) Int. Cl.
*H04L 29/06* (2006.01)
*H04L 9/40* (2022.01)

(52) U.S. Cl.
CPC .............. *H04L 63/20* (2013.01); *H04L 63/10* (2013.01); *H04L 63/1416* (2013.01); *H04L 63/1441* (2013.01)

(58) Field of Classification Search
CPC ... H04L 63/1416; H04L 63/10; H04L 63/108; H04L 63/107; H04L 63/20; H04L 63/0263
See application file for complete search history.

(56) References Cited

U.S. PATENT DOCUMENTS

| 9,992,064 | B1* | 6/2018 | Chawla ................. H04L 41/082 |
| 10,715,388 | B2 | 7/2020 | Fildebrandt et al. |
| 11,182,206 | B2 | 11/2021 | Jung et al. |
| 11,474,873 | B2 | 10/2022 | Biernat et al. |
| 11,513,877 | B2 | 11/2022 | Biernat et al. |
| 2018/0024537 | A1 | 1/2018 | Chauvet et al. |
| 2018/0054469 | A1 | 2/2018 | Simoncelli |

(Continued)

FOREIGN PATENT DOCUMENTS

| CN | 11-120-9011 | * | 5/2020 |
| KR | 20200027783 A | | 3/2020 |
| WO | 2020184362 A1 | | 9/2020 |

OTHER PUBLICATIONS

Extended European Search Report for European Patent Application No. 21179775.8, dated Nov. 25, 2021, 9 pages.

(Continued)

*Primary Examiner* — Longbit Chai
(74) *Attorney, Agent, or Firm* — Fletcher Yoder, PC

(57) ABSTRACT

An OT device includes a processor and a memory, accessible by the processor. The memory stores a first policy that includes a first set of settings associated with operation of the OT device. The memory also stores instructions that, when executed by the processor, cause the processor to enforce the first policy, receive a second policy and an indication of a trigger, wherein the second policy comprises a second set of settings associated with the operation of the OT device, receive an indication that the trigger is enabled, determine that the trigger is true, and, in response to the receiving the indication that the trigger is enabled and the determining that the trigger is true, enforce the second policy.

20 Claims, 8 Drawing Sheets

(56) References Cited

U.S. PATENT DOCUMENTS

| | | |
|---|---|---|
| 2019/0377604 A1 | 12/2019 | Cybulski |
| 2020/0136906 A1 | 4/2020 | Bernat et al. |
| 2020/0249928 A1 | 8/2020 | Zeng et al. |
| 2020/0278892 A1 | 9/2020 | Nainar et al. |
| 2020/0311617 A1 | 10/2020 | Swan et al. |
| 2021/0089354 A1 | 3/2021 | Nixon et al. |
| 2021/0200814 A1 | 7/2021 | Tal et al. |
| 2021/0218617 A1 | 7/2021 | Palavalli et al. |
| 2021/0382727 A1 | 12/2021 | Vigil et al. |
| 2022/0027217 A1 | 1/2022 | Thoemmes et al. |
| 2022/0091572 A1 | 3/2022 | Biernat et al. |

OTHER PUBLICATIONS

Partial European Search Report for European Patent Application No. 21180068.5, dated Dec. 8, 2021, 17 pages.

Marshall, "Industry 4.0: The PLC evolves from Controller to Cloud Interface," Feb. 9, 2018, https://www.rs-online.com/designspark/evolution-of-the-industrial-picfrom-controller-to-cloud-interface , retrieved on Nov. 29, 2021, pp. 1-6.

European Search Report for European Patent Application No. 21180068.5, dated Mar. 28, 2022,19 Pages.

Anonymous, "Pull an Image from a Private Registry", Kubernetes, retrieved on Mar. 18, 2022, 5 Pages, https://web.archive.org/web/20171003051312/https://kubernetes.io/docs/tasks/configure-pod-container/pull-image-private-registry/.

European Search Report for European Patent Application No. 21180279.8, dated Apr. 19, 2022,12 Pages.

D. Elliott, C. Otero, M. Ridley and X. Merino, "A Cloud-Agnostic Container Orchestrator for Improving Interoperability," 2018 IEEE 11th International Conference on Cloud Computing (Cloud), 2018, pp. 958-961, doi: 10.1109/CLOUD.2018.00145. (Year: 2018).

A. Khan, "Key Characteristics of a Container Orchestration Platform to Enable a Modern Application," in IEEE Cloud Computing, vol. 4, No. 5, pp. 42-48, Sep./Oct. 2017, doi: 10.1109/MCC.2017.4250933. (Year: 2017).

Liu, Y. et al., "A Data-Centric Internet of Things Framework Based on Azure Cloud," IEEE Access, vol. 7, Mar. 27, 2019, 20 pages.

* cited by examiner

SYSTEMS AND METHODS FOR SCHEDULED POLICY DEPLOYMENT IN OPERATIONAL TECHNOLOGY NETWORKS

BACKGROUND

The present disclosure generally relates to tools for deploying policies in operational technology (OT) networks.

Industrial automation systems may be used to provide automated control of one or more actuators in an industrial setting. OT networks may be used to communicatively couple industrial automation systems and/or industrial automation components within an industrial automation system. Policies may dictate access to and operation of OT assets within the OT network. When new policies are deployed, network communication lags, processing delays, devices being out of synchronization, and so forth may cause new policies to be deployed at different times, resulting in devices in the OT network attempting to comply with or enforce different policies simultaneously. Accordingly, improved techniques for deploying new policies in OT networks are desired.

This section is intended to introduce the reader to aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, an OT device includes a processor and a memory, accessible by the processor. The memory stores a first policy that includes a first set of settings associated with operation of the OT device. The memory also stores instructions that, when executed by the processor, cause the processor to enforce the first policy, receive a second policy and an indication of a trigger, wherein the second policy comprises a second set of settings associated with the operation of the OT device, receive an indication that the trigger is enabled, determine that the trigger is true, and in response to the receiving the indication that the trigger is enabled and the determining that the trigger is true, enforce the second policy.

In another embodiment, an edge device is configured to be disposed within an OT network and includes a processor and a memory. The memory stores a policy that includes a set of settings associated with operation of one or more OT devices within the OT network, as well as an indication of a trigger for implementing the policy. The memory also stores instructions that, when executed by the processor, cause the processor to transmit, to a first OT device of the one or more OT devices within the OT network, the policy and the indication of the trigger, receive, from the first OT device, verification of the policy and the indication of the trigger, and transmit, to the first OT device, an indication that the trigger is enabled, wherein the OT device is configured to begin enforcing the policy in response to the receiving the indication that the trigger is enabled and a determination that the trigger is true.

In a further embodiment, a method includes receiving first data associated with first event, identifying a first action in response to the first event based on a first policy, wherein the first policy comprises a first set of settings associated with operation of an operation technology (OT) device, performing the identified first action, receiving a second policy and an indication of a trigger, wherein the second policy includes a second set of settings associated with the operation of the OT device, verifying the second policy, wherein verifying the second policy comprises confirming receipt of the second policy and the indication of the trigger, determining that the OT device is capable of enforcing the second policy, or verifying an authenticity of the second policy, or any combination thereof, transmitting a message indicating that the second policy has been verified, receiving an indication that the trigger is enabled, determining that the trigger condition is true, and in response to the receiving the indication that the trigger is enabled and the determining that the trigger condition is true, enforcing the second policy. Enforcing the second policy includes receiving second data associated with a second event, identifying a second action in response to the second event based on the second policy, and performing the identified second action.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The present disclosure is directed to techniques for scheduled policy deployment in an operational technology (OT) network in order to reduce or eliminate an amount of time during which different devices in the OT network apply conflicting policies. Specifically, a scheduled policy and an indication of a trigger for implementing the scheduled policy may be distributed to one or more OT devices in an OT network. The OT devices may verify the received policy. Verification may include, for example, confirming receipt of the scheduled policy, determining that the OT device is capable of enforcing the policy, verifying authenticity of the scheduled policy. Further, in some embodiments, synchronization data may be transmitted to OT devices to synchronize clocks of the OT devices. Messages may be transmitted to the OT devices that the trigger is enabled. Upon determination that the trigger is enabled and that the trigger is true, the OT devices may begin enforcing the scheduled policy. The trigger may be receipt of the indication that the trigger is enabled, passage of a particular moment in time, a state or condition being detected, a network message being received (e.g., instructions to enforce the scheduled policy), or any combination thereof. Additional details with regard to scheduled policy deployment in OT devices in accordance with the techniques described above will be provided below with reference to FIGS. 1-8.

Figure 1:
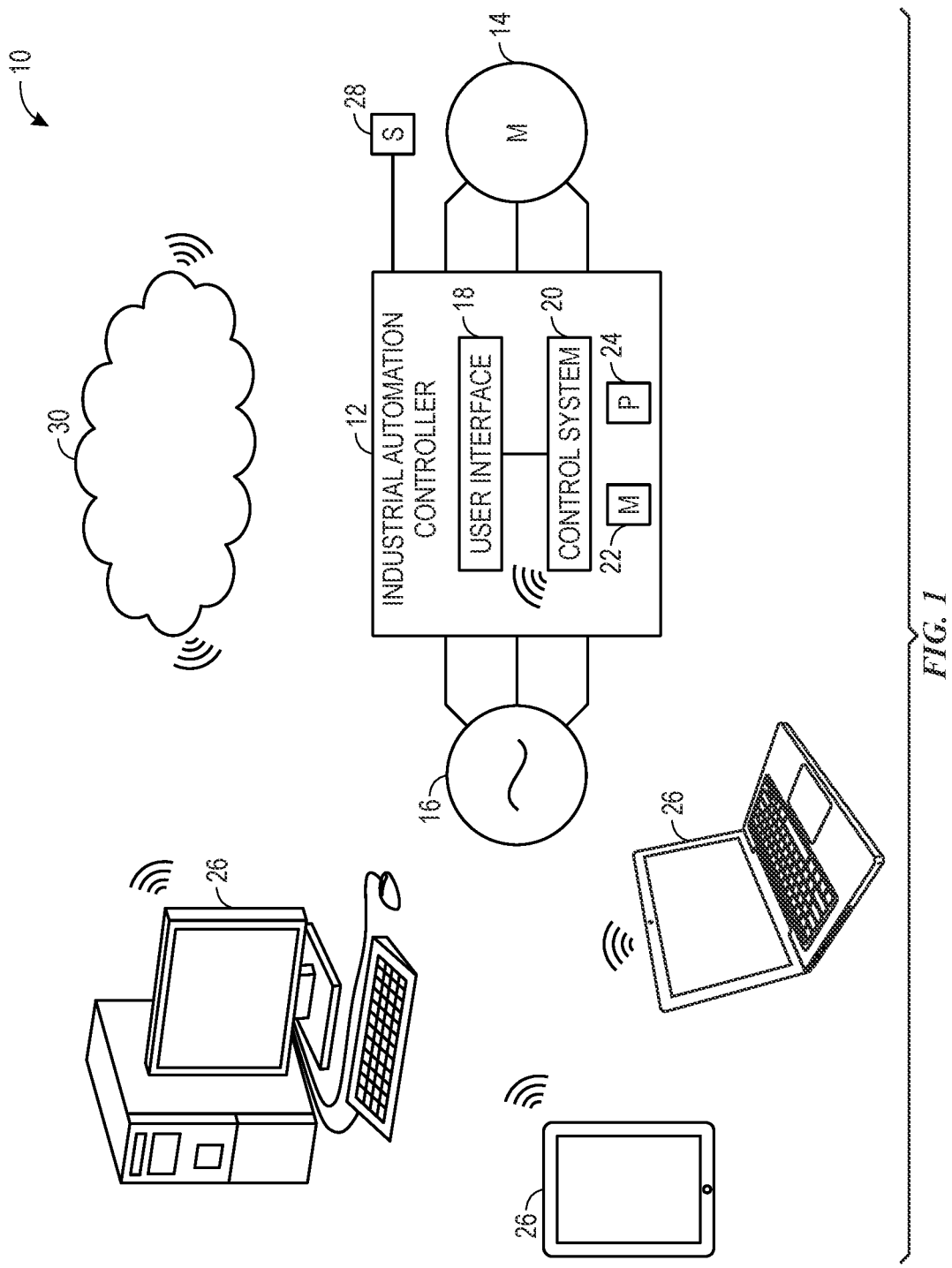
FIG. 1 is a schematic view of an industrial automation system, in accordance with embodiments presented herein.

By way of introduction, FIG. 1 is a schematic view of an example industrial automation system 10 in which the embodiments described herein may be implemented. As shown, the industrial automation system 10 includes a controller 12 and an actuator 14 (e.g., a motor). The industrial automation system 10 may also include, or be coupled to, a power source 16. The power source 16 may include a generator, an external power grid, a battery, or some other source of power. The controller 12 may be a stand-alone control unit that controls multiple industrial automation components (e.g., a plurality of motors 14), a controller 12 that controls the operation of a single automation component (e.g., motor 14), or a subcomponent within a larger industrial automation system 10. In the instant embodiment, the controller 12 includes a user interface 18, such as a human machine interface (HMI), and a control system 20, which may include a memory 22 and a processor 24. The controller 12 may include a cabinet or some other enclosure for housing various components of the industrial automation system 10, such as a motor starter, a disconnect switch, etc.

The control system 20 may be programmed (e.g., via computer readable code or instructions stored on the memory 22, such as a non-transitory computer readable medium, and executable by the processor 24) to provide signals for controlling the motor 14. In certain embodiments, the control system 20 may be programmed according to a specific configuration desired for a particular application. For example, the control system 20 may be programmed to respond to external inputs, such as reference signals, alarms, command/status signals, etc. The external inputs may originate from one or more relays or other electronic devices. The programming of the control system 20 may be accomplished through software or firmware code that may be loaded onto the internal memory 22 of the control system 20 (e.g., via a locally or remotely located computing device 26) or programmed via the user interface 18 of the controller 12. The control system 20 may respond to a set of operating parameters. The settings of the various operating parameters may determine the operating characteristics of the controller 12. For example, various operating parameters may determine the speed or torque of the motor 14 or may determine how the controller 12 responds to the various external inputs. As such, the operating parameters may be used to map control variables within the controller 12 or to control other devices communicatively coupled to the controller 12. These variables may include, for example, speed presets, feedback types and values, computational gains and variables, algorithm adjustments, status and feedback variables, programmable logic controller (PLC) control programming, and the like.

In some embodiments, the controller 12 may be communicatively coupled to one or more sensors 28 for detecting operating temperatures, voltages, currents, pressures, flow rates, and other measurable variables associated with the industrial automation system 10. With feedback data from the sensors 28, the control system 20 may keep detailed track of the various conditions under which the industrial automation system 10 may be operating. For example, the feedback data may include conditions such as actual motor speed, voltage, frequency, power quality, alarm conditions, etc. In some embodiments, the feedback data may be communicated back to the computing device 26 for additional analysis.

The computing device 26 may be communicatively coupled to the controller 12 via a wired or wireless connection. The computing device 26 may receive inputs from a user defining an industrial automation project using a native application running on the computing device 26 or using a website accessible via a browser application, a software application, or the like. The user may define the industrial automation project by writing code, interacting with a visual programming interface, inputting or selecting values via a graphical user interface, or providing some other inputs. The user may use licensed software and/or subscription services to create, analyze, and otherwise develop the project. The computing device 26 may send a project to the controller 12 for execution. Execution of the industrial automation project causes the controller 12 to control components (e.g., motor 14) within the industrial automation system 10 through performance of one or more tasks and/or processes. In some applications, the controller 12 may be communicatively positioned in a private network and/or behind a firewall, such that the controller 12 does not have communication access outside a local network and is not in communication with any devices outside the firewall, other than the computing device 26. The controller 12 may collect feedback data during execution of the project, and the feedback data may be provided back to the computing device 26 for analysis. Feedback data may include, for example, one or more execution times, one or more alerts, one or more error messages, one or more alarm conditions, one or more temperatures, one or more pressures, one or more flow rates, one or more motor speeds, one or more voltages, one or more frequencies, and so forth. The project may be updated via the computing device 26 based on the analysis of the feedback data.

The computing device 26 may be communicatively coupled to a cloud server 30 or remote server via the internet, or some other network. In one embodiment, the cloud server 30 may be operated by the manufacturer of the controller 12, a software provider, a seller of the controller 12, a service provider, operator of the controller 12, owner of the controller 12, etc. The cloud server 30 may be used to help customers create and/or modify projects, to help troubleshoot any problems that may arise with the controller 12, develop policies, or to provide other services (e.g., project analysis, enabling, restricting capabilities of the controller 12, data analysis, controller firmware updates, etc.). The remote/cloud server 30 may be one or more servers operated by the manufacturer, software provider, seller, service provider, operator, or owner of the controller 12. The remote/cloud server 30 may be disposed at a facility owned and/or operated by the manufacturer, software provider, seller, service provider, operator, or owner of the controller 12. In other embodiments, the remote/cloud server 30 may be disposed in a datacenter in which the manufacturer, software provider, seller, service provider, operator, or owner of the controller 12 owns or rents server space. In further embodiments, the remote/cloud server 30 may include multiple servers operating in one or more data center to provide a cloud computing environment.

Figure 2:
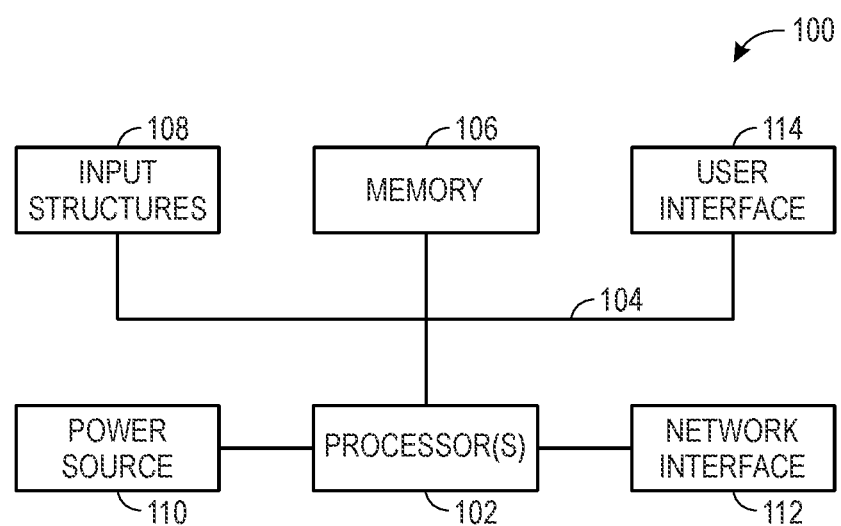
FIG. 2 is a block diagram of example components that could be used in the industrial automation system of FIG. 1, in accordance with embodiments presented herein.

FIG. 2 illustrates a block diagram of example components of a computing device 100 that could be used as the computing device 26, the cloud/remote server 30, the controller 12, or some other device within the system 10 shown in FIG. 1. As used herein, a computing device 100 may be implemented as one or more computing systems including laptop, notebook, desktop, tablet, HMI, or workstation computers, as well as server type devices or portable, communication type devices, such as cellular telephones and/or other suitable computing devices.

As illustrated, the computing device 100 may include various hardware components, such as one or more processors 102, one or more busses 104, memory 106, input structures 108, a power source 110, a network interface 112, a user interface 114, and/or other computer components useful in performing the functions described herein.

The one or more processors 102 may include, in certain implementations, microprocessors configured to execute instructions stored in the memory 106 or other accessible locations. Alternatively, the one or more processors 102 may be implemented as application-specific integrated circuits (ASICs), field-programmable gate arrays (FPGAs), and/or other devices designed to perform functions discussed herein in a dedicated manner. As will be appreciated, multiple processors 102 or processing components may be used to perform functions discussed herein in a distributed or parallel manner.

The memory 106 may encompass any tangible, non-transitory medium for storing data or executable routines. Although shown for convenience as a single block in FIG. 2, the memory 106 may encompass various discrete media in the same or different physical locations. The one or more processors 102 may access data in the memory 106 via one or more busses 104.

The input structures 108 may allow a user to input data and/or commands to the device 100 and may include mice, touchpads, touchscreens, keyboards, controllers, and so forth. The power source 110 can be any suitable source for providing power to the various components of the computing device 100, including line and battery power. In the depicted example, the device 100 includes a network interface 112. Such a network interface 112 may allow communication with other devices on a network using one or more communication protocols. In the depicted example, the device 100 includes a user interface 114, such as a display that may display images or data provided by the one or more processors 102. The user interface 114 may include, for example, a monitor, a display, and so forth. As will be appreciated, in a real-world context a processor-based system, such as the computing device 100 of FIG. 2, may be employed to implement some or all of the present approach, such as performing the functions of the controller, the computing device 26, and/or the cloud/remote server 30 shown in FIG. 1, as well as other memory-containing devices.

Figure 3:
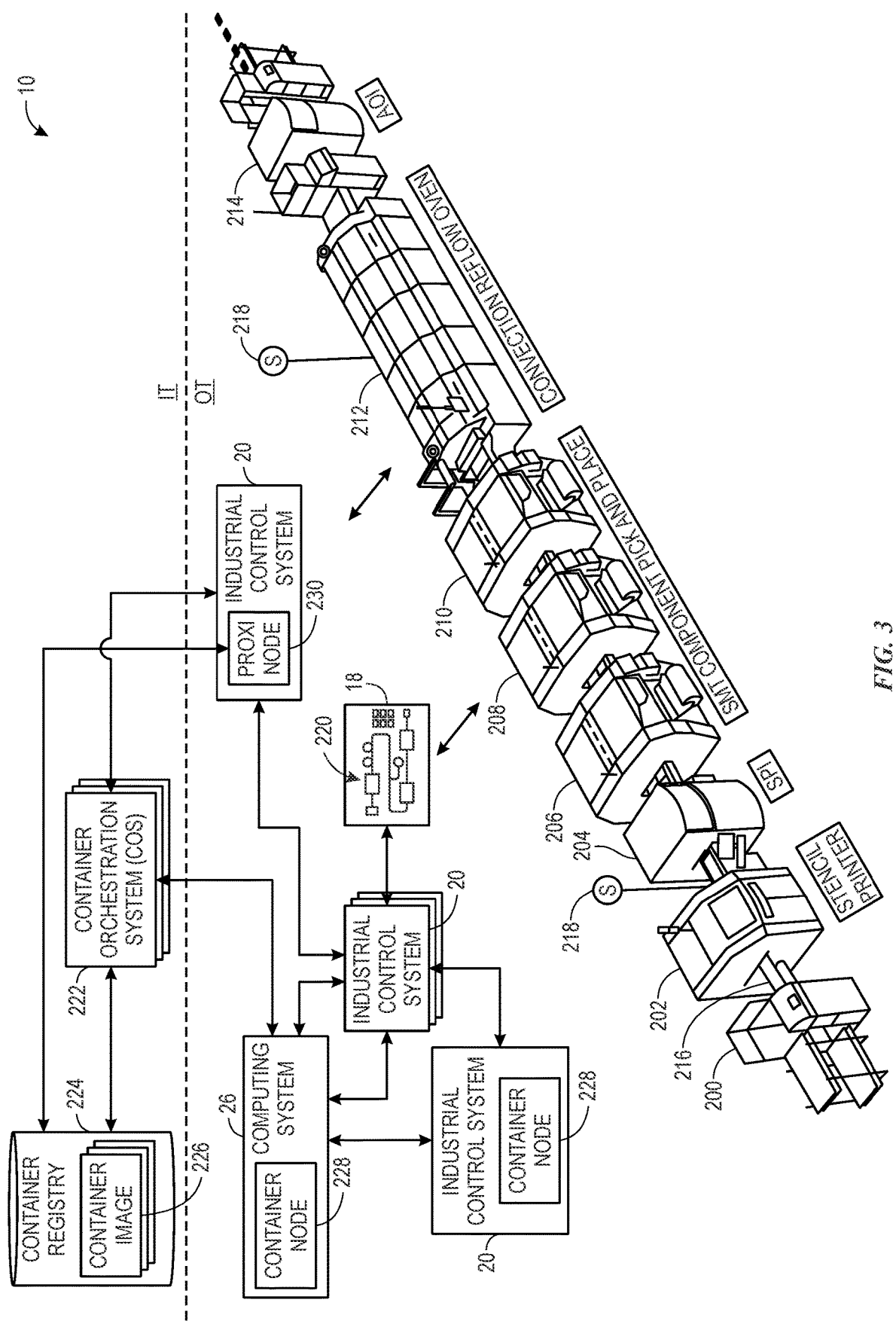
FIG. 3 is a perspective view of an example of the industrial automation system of FIG. 1 controlled by an industrial control system, in accordance with an embodiment.

FIG. 3 is a perspective view of an example of the industrial automation system 10 of FIG. 1. The industrial automation system 10 includes stations 200, 202, 204, 206, 208, 210, 212, 214 having machine components and/or machines to conduct functions within an automated process, such as silicon wafer manufacturing, as is depicted. The automated process may begin at a station 200 used for loading objects, such as substrates, into the industrial automation system 10 via a conveyor section 216. For example, objects may be transported along the conveyor section 216 to station 202 to perform a first action, such a printing solder paste to the substrate via stenciling. As objects exit from the station 202, the objects may be transported via the conveyor section 216 to a station 204 for solder paste inspection (SPI) to inspect printer results, to a station 206, 208, and 210 for surface mount technology (SMT) component placement, to a station 212 for convection reflow oven to melt the solder to make electrical couplings, and finally to a station 214 for automated optical inspection (AOI) to inspect the object manufactured (e.g., the manufactured printed circuit board). After the objects proceed through the various stations, the objects may be removed from the station 214, for example, for storage in a warehouse or for shipment. It should be understood, however, that, for other applications, the particular system, machine components, machines, stations, and/or conveyors may be different or specially adapted to the application.

For example, the industrial automation system 10 may include machinery to perform various operations in a compressor station, an oil refinery, a batch operation for making food items, chemical processing operations, brewery operations, mining operations, a mechanized assembly line, and so forth. Accordingly, the industrial automation system 10 may include a variety of operational components, such as electric motors, valves, actuators, temperature elements, pressure sensors, or a myriad of machinery or devices used for manufacturing, processing, material handling, and other applications. The industrial automation system 10 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Each of these described operational components may correspond to and/or generate a variety of operational technology (OT) data regarding operation, status, sensor data, operational modes, alarm conditions, or the like, that may be desirable to output for analysis with IT data from an IT network, for storage in an IT network, for analysis with expected operation set points (e.g., thresholds), or the like.

In certain embodiments, one or more properties of the industrial automation system 10 equipment, such as the stations 200, 202, 204, 206, 208, 210, 212, 214, may be monitored and controlled by the industrial control systems 20 for regulating control variables. For example, sensing devices (e.g., sensors 218) may monitor various properties of the industrial automation system 10 and may be used by the industrial control systems 20 at least in part in adjusting operations of the industrial automation system 10 (e.g., as part of a control loop). In some cases, the industrial automation system 10 may be associated with devices used by other equipment. For instance, scanners, gauges, valves, flow meters, and the like may be disposed on or within the industrial automation system 10. Here, the industrial control systems 20 may receive data from the associated devices and use the data to perform their respective operations more efficiently. For example, a controller of the industrial automation system 10 associated with a motor drive may receive data regarding a temperature of a connected motor and may adjust operations of the motor drive based on the data.

The industrial control systems 20 may include or be communicatively coupled to the display/operator interface 18 (e.g., a human-machine interface (HMI)) and to devices of the industrial automation system 10. It should be understood that any suitable number of industrial control systems 20 may be used in a particular industrial automation system 10 embodiment. The industrial control systems 20 may facilitate representing components of the industrial automation system 10 through programming objects that may be instantiated and executed to provide simulated functionality similar or identical to the actual components, as well as visualization of the components, or both, on the display/operator interface 18. The programming objects may include code and/or instructions stored in the industrial control systems 20 and executed by processing circuitry of the industrial control systems 20. The processing circuitry may communicate with memory circuitry to permit the storage of the component visualizations.

As illustrated, a display/operator interface 18 may be configured to depict representations 220 of the components of the industrial automation system 10. The industrial control system 20 may use data transmitted by the sensors 218 to update visualizations of the components via changing one or more statuses, states, and/or indications of current operations of the components. These sensors 218 may be any suitable device adapted to provide information regarding process conditions. Indeed, the sensors 218 may be used in a process loop (e.g., control loop) that may be monitored and controlled by the industrial control system 20. As such, a process loop may be activated based on process inputs (e.g., an input from the sensor 218) or direct input from a person via the display/operator interface 18. The person operating and/or monitoring the industrial automation system 10 may reference the display/operator interface 18 to determine various statuses, states, and/or current operations of the industrial automation system 10 and/or for a particular component. Furthermore, the person operating and/or monitoring the industrial automation system 10 may adjust to various components to start, stop, power-down, power-on, or otherwise adjust an operation of one or more components of the industrial automation system 10 through interactions with control panels or various input devices.

The industrial automation system 10 may be considered a data-rich environment with several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted as OT data. In addition, sensors 218 may gather OT data indicative of one or more operations of the industrial automation system 10 or the industrial control system 20. In this way, the OT data may be analog data or digital data indicative of measurements, statuses, alarms, or the like associated with operation of the industrial automation system 10 or the industrial control system 20.

The industrial control systems 12 described above may operate in an OT space in which OT data is used to monitor and control OT assets, such as the equipment illustrated in the stations 200, 202, 204, 206, 208, 210, 212, 214 of the industrial automation system 10 or other industrial equipment. The OT space, environment, or network generally includes direct monitoring and control operations that are coordinated by the industrial control system 20 and a corresponding OT asset. For example, a programmable logic controller (PLC) may operate in the OT network to control operations of an OT asset (e.g., drive, motor, and/or high-level controllers). The industrial control systems 20 may be specifically programmed or configured to communicate directly with the respective OT assets.

A container orchestration system 222, on the other hand, may operate in an information technology (IT) environment. That is, the container orchestration system 222 may include a cluster of multiple computing devices that coordinates an automatic process of managing or scheduling work of individual containers for applications within the computing devices of the cluster. In other words, the container orchestration system 222 may be used to automate various tasks at scale across multiple computing devices. By way of example, the container orchestration system 222 may automate tasks such as configuring and scheduling deployment of containers, provisioning and deploying containers, determining availability of containers, configuring applications in terms of the containers that they run in, scaling of containers to equally balance application workloads across an infrastructure, allocating resources between containers, performing load balancing, traffic routing, and service discovery of containers, performing health monitoring of containers, securing the interactions between containers, and the like. In any case, the container orchestration system 222 may use configuration files to determine a network protocol to facilitate communication between containers, a storage location to save logs, and the like. The container orchestration system 222 may also schedule deployment of containers into clusters and identify a host (e.g., node) that may be best suited for executing the container. After the host is identified, the container orchestration system 222 may manage the lifecycle of the container based on predetermined specifications.

With the foregoing in mind, it should be noted that containers refer to technology for packaging an application along with its runtime dependencies. That is, containers include applications that are decoupled from an underlying host infrastructure (e.g., operating system). By including the run time dependencies with the container, the container may perform in the same manner regardless of the host in which it is operating. In some embodiments, containers may be stored in a container registry 224 as container images 226. The container registry 224 may be any suitable data storage or database that may be accessible to the container orchestration system 222. The container image 226 may correspond to an executable software package that includes the tools and data employed to execute a respective application. That is, the container image 226 may include related code for operating the application, application libraries, system libraries, runtime tools, default values for various settings, and the like.

By way of example, an integrated development environment (IDE) tool may be employed by a user to create a deployment configuration file that specifies a desired state for the collection of nodes of the container orchestration system 222. The deployment configuration file may be stored in the container registry 224 along with the respective container images 226 associated with the deployment configuration file. The deployment configuration file may include a list of different pods and a number of replicas for each pod that should be operating within the container orchestration system 222 at any given time. Each pod may correspond to a logical unit of an application, which may be associated with one or more containers. The container orchestration system 222 may coordinate the distribution and execution of the pods listed in the deployment configuration file, such that the desired state is continuously met. In some embodiments, the container orchestration system 222 may include a master node that retrieves the deployment configuration files from the container registry 224, schedules the deployment of pods to the connected nodes, and ensures that the desired state specified in the deployment configuration file is met. For instance, if a pod stops operating on one node, the master node may receive a notification from the respective worker node that is no longer executing the pod and deploy the pod to another worker node to ensure that the desired state is present across the cluster of nodes.

As mentioned above, the container orchestration system 222 may include a cluster of computing devices, computing systems, or container nodes that may work together to achieve certain specifications or states, as designated in the respective container. In some embodiments, container nodes 228 may be integrated within industrial control systems 20 as shown in FIG. 3. That is, container nodes 228 may be implemented by the industrial control systems 20, such that they appear as worker nodes to the master node in the container orchestration system 222. In this way, the master node of the container orchestration system 222 may send commands to the container nodes 228 that are also configured to perform applications and operations for the respective industrial equipment.

With this in mind, the container nodes 228 may be integrated with the industrial control systems 20, such that they serve as passive-indirect participants, passive-direct participants, or active participants of the container orchestration system 222. As passive-indirect participants, the container nodes 228 may respond to a subset of all of the commands that may be issued by the container orchestration system 222. In this way, the container nodes 228 may support limited container lifecycle features, such as receiving pods, executing the pods, updating a respective filesystem to included software packages for execution by the industrial control system 20, and reporting the status of the pods to the master node of the container orchestration system 222. The limited features implementable by the container nodes 228 that operate in the passive-indirect mode may be limited to commands that the respective industrial control system 20 may implement using native commands that map directly to the commands received by the master node of the container orchestration system 222. Moreover, the container node 228 operating in the passive-indirect mode of operation may not be capable to push the packages or directly control the operation of the industrial control system 20 to execute the package. Instead, the industrial control system 20 may periodically check the file system of the container node 228 and retrieve the new package at that time for execution.

As passive-direct participants, the container nodes 228 may operate as a node that is part of the cluster of nodes for the container orchestration system 222. As such, the container node 228 may support the full container lifecycle features. That is, container node 228 operating in the passive-direct mode may unpack a container image and push the resultant package to the industrial control system 20, such that the industrial control system 20 executes the package in response to receiving it from the container node 228. As such, the container orchestration system 222 may have access to a worker node that may directly implement commands received from the master node onto the industrial control system 20.

In the active participant mode, the container node 228 may include a computing module or system that hosts an operating system (e.g., Linux) that may continuously operate a container host daemon that may participate in the management of container operations. As such, the active participant container node 228 may perform any operations that the master node of the container orchestration system 222 may perform. By including a container node 228 operating in the OT space, the container orchestration system 222 is capable of extending its management operations into the OT space. That is, the container node 228 may provision devices in the OT space, serve as a proxy node 230 to provide bi-directional coordination between the IT space and the OT space, and the like. For instance, the container node 228 operating as the proxy node 230 may intercept orchestration commands and cause industrial control system 20 to implement appropriate machine control routines based on the commands. The industrial control system 20 may confirm the machine state to the proxy node 230, which may then reply to the master node of the container orchestration system 222 on behalf of the industrial control system 20.

Additionally, the industrial control system 20 may share an OT device tree via the proxy node 230. As such, the proxy node 230 may provide the master node with state data, address data, descriptive metadata, versioning data, certificate data, key information, and other relevant parameters concerning the industrial control system 20. Moreover, the proxy node 230 may issue requests targeted to other industrial control systems 20 to control other OT devices. For instance, the proxy node 230 may translate and forward commands to a target OT device using one or more OT communication protocols, may translate and receive replies from the OT devices, and the like. As such, the proxy node 230 may perform health checks, provide configuration updates, send firmware patches, execute key refreshes, and other OT operations for other OT devices.

Figure 4:
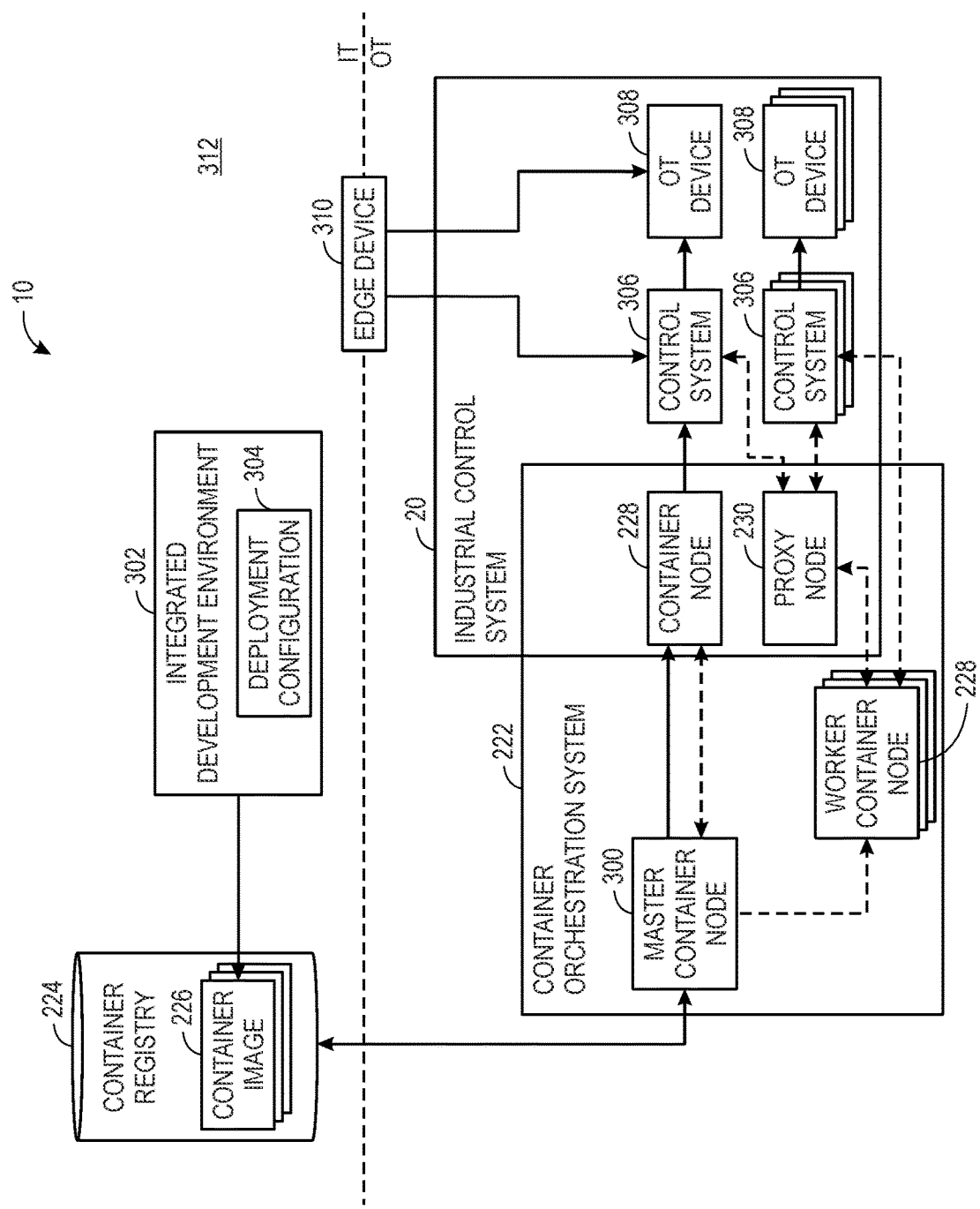
FIG. 4 is a block diagram of an example operational technology (OT) network, including the industrial control system of FIG. 3, that coordinates with a container orchestration system, in accordance with an embodiment.

FIG. 4 illustrates a block diagram that depicts the relative positions of the container node 228 and the proxy node 230 with respect to the container orchestration system 222. As mentioned above, the container orchestration system 222 may include a collection of nodes that are used to achieve a desired state of one or more containers across multiple nodes. As shown in FIG. 4, the container orchestration system 222 may include a master node 300 that may execute control plane processes for the container orchestration system 222. The control plane processes may include the processes that enable the container orchestration system 222 to coordinate operations of the container nodes 228 to meet the desired states. As such, the master container node 300 may execute an applications programming interface (API) for the container orchestration system 222, a scheduler component, core resource controllers, and the like. By way of example, the master container node 300 may coordinate all of the interactions between nodes of the cluster that make up the container orchestration system 222. Indeed, the master container node 300 may be responsible for deciding the operations that will run on container nodes 228 including scheduling workloads (e.g., containerized applications), managing the workloads' lifecycle, scaling, and upgrades, managing network and storage resources for the workloads, and the like. The master container node 300 may run an API server to handle requests and status updates received from the container nodes 228.

By way of operation, an integrated development environment (IDE) tool 302 may be used by an operator to develop a deployment configuration file 304. As mentioned above, the deployment configuration file 304 may include details regarding the containers, the pods, constraints for operating the containers/pods, and other information that describe a desired state of the containers specified in the deployment configuration file 304. In some embodiments, the deployment configuration file 304 may be generated in a YAML file, a JSON file, or other suitable file format that is compatible with the container orchestration system 222. After the IDE tool 302 generates the deployment configuration file 304, the IDE tool 302 may transmit the deployment configuration file 304 to the container registry 224, which may store the file along with container images 226 representative of the containers stored in the deployment configuration file 304.

In some embodiments, the master container node 300 may receive the deployment configuration file 304 via the container registry 224, directly from the IDE tool 302, or the like. The master container node 300 may use the deployment configuration file 304 to determine a location to gather the container images 226, determine communication protocols to use to establish networking between container nodes 228, determine locations for mounting storage volumes, locations to store logs for the containers, and the like.

Based on the desired state provided in the deployment configuration file 304, the master container node 300 may deploy containers to the container host nodes 228. That is, the master container node 300 may schedule the deployment of a container based on constraints (e.g., CPU or memory availability) provided in the deployment configuration file 304. After the containers are operating on the container nodes 228, the master container node 300 may manage the lifecycle of the containers to ensure that the containers specified by the deployment configuration file 304 are operating according to the specified constraints and the desired state.

Keeping the foregoing in mind, the industrial control system 20 may not use an operating system (OS) that is compatible with the container orchestration system 222. That is, the container orchestration system 222 may be configured to operate in the IT space that involves the flow of digital information. In contrast, the industrial control system 20 may operate in the OT space that involves managing the operation of physical processes and the machinery used to perform those processes. For example, the OT space may involve communications that are formatted according to OT communication protocols, such as FactoryTalk LiveData, EtherNet/IP, Common Industrial Protocol (CIP), OPC Direct Access (e.g., machine to machine communication protocol for industrial automation developed by the OPC Foundation), OPC Unified Architecture (OPCUA), or any suitable OT communication protocol (e.g. DNP3, Modbus, Profibus, LonWorks, DALI, BACnet, KNX, EnOcean). Because the industrial control systems 20 operate in the OT space, the industrial control systems may not be capable of implementing commands received via the container orchestration system 222.

In certain embodiments, the container node 228 may be programmed or implemented in the industrial control system 20 to serve as a node agent that can register the industrial control system 20 with the master container node 300. The node agent may or may not be the same as the proxy node 230 shown in FIG. 3. For example, the industrial control system 20 may include a PLC that cannot support an operating system (e.g., Linux) for receiving and/or implementing requested operations issued by the container orchestration system 222. However, the PLC may perform certain operations that may be mapped to certain container events. As such, the container node 228 may include software and/or hardware components that may map certain events or commands received from the master container node 300 into actions that may be performed by the PLC. After converting the received command into a command interpretable by the PLC, the container node 228 may forward the mapped command to the PLC that may implement the mapped command. As such, the container node 228 may operate as part of the cluster of nodes that make up the container orchestration system 222, while a first control system 306 (e.g., PLC) that coordinates the OT operations for a second OT device 308 in the industrial control system 12. The first control system 306 may include a controller, such as a PLC, an HLC, a programmable automation controller (PAC), or any other controller that may monitor, control, and operate an industrial automation device or component.

The OT device 308 may correspond to an industrial automation device or component. The OT device 308 may include any suitable industrial device that operates in the OT space. As such, the OT device 308 may be involved in adjusting physical processes being implemented via the industrial system 10. In some embodiments, the OT device 308 may include motor control centers, motors, HMIs, operator interfaces, contactors, starters, sensors, drives, relays, protection devices, switchgear, compressors, network switches (e.g., Ethernet switches, modular-managed, fixed-managed, service-router, industrial, unmanaged, etc.) and the like. In addition, the OT device 308 may also be related to various industrial equipment such as mixers, machine conveyors, tanks, skids, specialized original equipment manufacturer machines, and the like. The OT device 308 may also be associated with devices used by the equipment such as scanners, gauges, valves, flow meters, and the like.

In the present embodiments described herein, the control system 306 may thus perform actions based on commands received from the container node 228. By mapping certain container lifecycle states into appropriate corresponding actions implementable by the control system 306, the container node 228 enables program content for the industrial control system 20 to be containerized, published to certain registries, and deployed using the master container node 300, thereby bridging the gap between the IT-based container orchestration system 222 and the OT-based industrial control system 20.

In some embodiments, the container node 228 may operate in an active mode, such that the container node may invoke container orchestration commands for other container nodes 228. For example, a proxy node 230 may operate as a proxy or gateway node that is part of the container orchestration system 222. The proxy node 230 may be implemented in a sidecar computing module that has an operating system (OS) that supports the container host daemon. In another embodiment, the proxy node 230 may be implemented directly on a core of the control system 306 that is configured (e.g., partitioned), such that the control system 306 may operate using an operating system that allows the container node 228 to execute orchestration commands and serve as part of the container orchestration system 222. In either case, the proxy node 230 may serve as a bi-directional bridge for IT/OT orchestration that enables automation functions to be performed in IT devices based on OT data and in OT devices 308 based on IT data. For instance, the proxy node 230 may acquire OT device tree data, state data for an OT device, descriptive metadata associated with corresponding OT data, versioning data for OT devices 308, certificate/key data for the OT device, and other relevant OT data via OT communication protocols. The proxy node 230 may then translate the OT data into IT data that may be formatted to enable the master container node 300 to extract relevant data (e.g., machine state data) to perform analysis operations and to ensure that the container orchestration system 222 and the connected control systems 306 are operating at the desired state. Based on the results of its scheduling operations, the master container node 300 may issue supervisory control commands to targeted OT devices via the proxy nodes 230, which may translate and forward the translated commands to the respective control system 306 via the appropriate OT communication protocol.

In addition, the proxy node 230 may also perform certain supervisory operations based on its analysis of the machine state data of the respective control system 306. As a result of its analysis, the proxy node 230 may issue commands and/or pods to other nodes that are part of the container orchestration system 222. For example, the proxy node 230 may send instructions or pods to other worker container nodes 228 that may be part of the container orchestration system 222. The worker container nodes 228 may corresponds to other container nodes 228 that are communicatively coupled to other control systems 306 for controlling other OT devices 308. In this way, the proxy node 230 may translate or forward commands directly to other control systems 306 via certain OT communication protocols or indirectly via the other worker container nodes 228 associated with the other control systems 306. In addition, the proxy node 230 may receive replies from the control systems 306 via the OT communication protocol and translate the replies, such that the nodes in the container orchestration system 222 may interpret the replies. In this way, the container orchestration system 222 may effectively perform health checks, send configuration updates, provide firmware patches, execute key refreshes, and provide other services to OT devices 308 in a coordinated fashion. That is, the proxy node 230 may enable the container orchestration system to coordinate the activities of multiple control systems 306 to achieve a collection of desired machine states for the connected OT devices 308.

As shown in FIG. 4, the industrial automation system 10 may include one or more edge devices 310 that deploy, enforce, and/or implement one or more policies or policy updates to one or more policy enforcement points (e.g., OT assets 306, 308) within the industrial automation system 10. In some embodiments, the edge device 310 itself may act as a policy enforcement point. As used herein, an "edge device" 310 is a device within the industrial automation system 10 that controls data flow within the industrial automation system 10 (e.g., the OT network) as well as between the industrial automation system 10 (e.g., the OT network) and an IT network 312. For example, the edge device 310 may be a router, a switch, or the like. In certain embodiments, the edge device 310 may receive a policy update (e.g., a security update) from the network 312 that may include, for example, an enterprise system, a server device, a plant management system, or the like. The enterprise system may include software and/or hardware components that support business processes, information flows, reporting, data analytics, and the like for an enterprise. The server device may include a policy server that manages communication between the components of the industrial automation system 10. That is, the policy server may manage one or more policies that include provisions or instructions that detail how communication between the components of the industrial automation system 10 is performed. As such, the server device may implement a policy (e.g., a security update) related to centrally managing communications between the components of the industrial automation system 10. The plant management system may include any suitable management computing system that receives data from a number of control systems (e.g., industrial control systems 20). As such, the plant management system may track operations of one or more facilities and one or more locations. In addition, the plant management system may issue control commands to the components of the industrial automation system 10.

A policy is a set of one or more rules or procedures that govern access and use of an organization's OT assets (e.g., industrial automation devices associated with OT machines). Characteristics of policies may include confidentiality, availability, integrity, authentication, operation, and non-repudiation of the organization's OT assets. A policy may include a set of two or more settings that identify data or information for components of the industrial automation system 10, or endpoints thereof, that are to be trusted, information regarding which communication ports to use, and the like. As such, a policy sets forth provisions that may govern management of OT assets, access to such assets, backups of such assets, security of such assets, operation of such assets, management of data used and/or generated by such assets, and the like. For example, a policy may define provisions addressing acceptable usage of OT/IT assets, antivirus management, data backup and disaster recovery, change management, cryptography usage, data and asset classification, data retention, data support and operations, data usage, email/messaging protection policies, user identity and access management, incident response, threat protection, internet usage restrictions, mobile device policy, OT/IT network security, password and credential protocols, firmware/patch management, personnel security, physical and environmental security, malware/spyware/ransomware detection, system update schedules, wireless network access, guest access, and so forth. Accordingly, a policy may govern, for example, how to manage who has access to what OT devices, what files and/or communications should be encrypted, what ports can be used for what purposes, characteristics of passwords (e.g., number of characters, upper and lower case letters, numbers, special characters), how often users must change their passwords, how often backups are done, how long backups are retained, guidelines for accessing wireless internet, what happens when a threat occurs, processes for onboarding/offboarding users as they start and leave positions, the process that occurs when a user changes roles, maintenance procedures, and so forth.

As used herein, a "policy update" may refer to a new policy, or set of policies, to be implemented by the OT asset or enforced at one or more policy enforcement points within the industrial automation system 10, an update to an existing policy implemented by the OT asset or enforced at the one or more policy enforcement points within the industrial automation system 10, a new setting to be implemented by the OT asset, an update to an existing setting implemented by the OT asset, a new rule to be implemented by the OT asset, an update to an existing rule implemented by the OT asset, software (e.g., code) to be implemented by the OT asset, an update to at least a portion of software (e.g., code) implemented by the OT asset, data (e.g., configuration data) to be utilized by the software implemented by the OT asset, an update to existing data (e.g., configuration data) utilized by the software implemented by the OT asset, a new version of firmware to be implemented by the OT asset, an update to an existing version of firmware implemented by the OT asset, or the like. After receiving one or more policy updates from the network 312, the edge device 310 may push a policy update to the components of the industrial automation system 10, or the components of the industrial automation system 10 may pull the policy update from the edge device 310. As described in more detail below, policy updates may be deployed (e.g., enforcement of the new policies may begin) at a scheduled time, upon receipt of a trigger message, upon some triggering event taking place, etc., or some combination thereof.

Policies may be developed and implemented based on design artifacts of the industrial automation system 10 and/or information about the architecture of the industrial automation system 10 and how the industrial automation system 10 is intended to operate (e.g., product being produced, industry, location, anticipated operating conditions, and so forth). Further, once a set of policies have been implemented and/or enforced at one or more policy enforcement points while the industrial automation system 10 is operating, data collected during the operation of the industrial automation system 10 (e.g., run-time data, help ticket data, incident data, vulnerability data, data received from one or more service providers, one or more customers, one or more partner organizations, one or more suppliers, and so forth) may be used to generate recommended updates to the current set of implemented and/or enforced policies.

Figure 5:
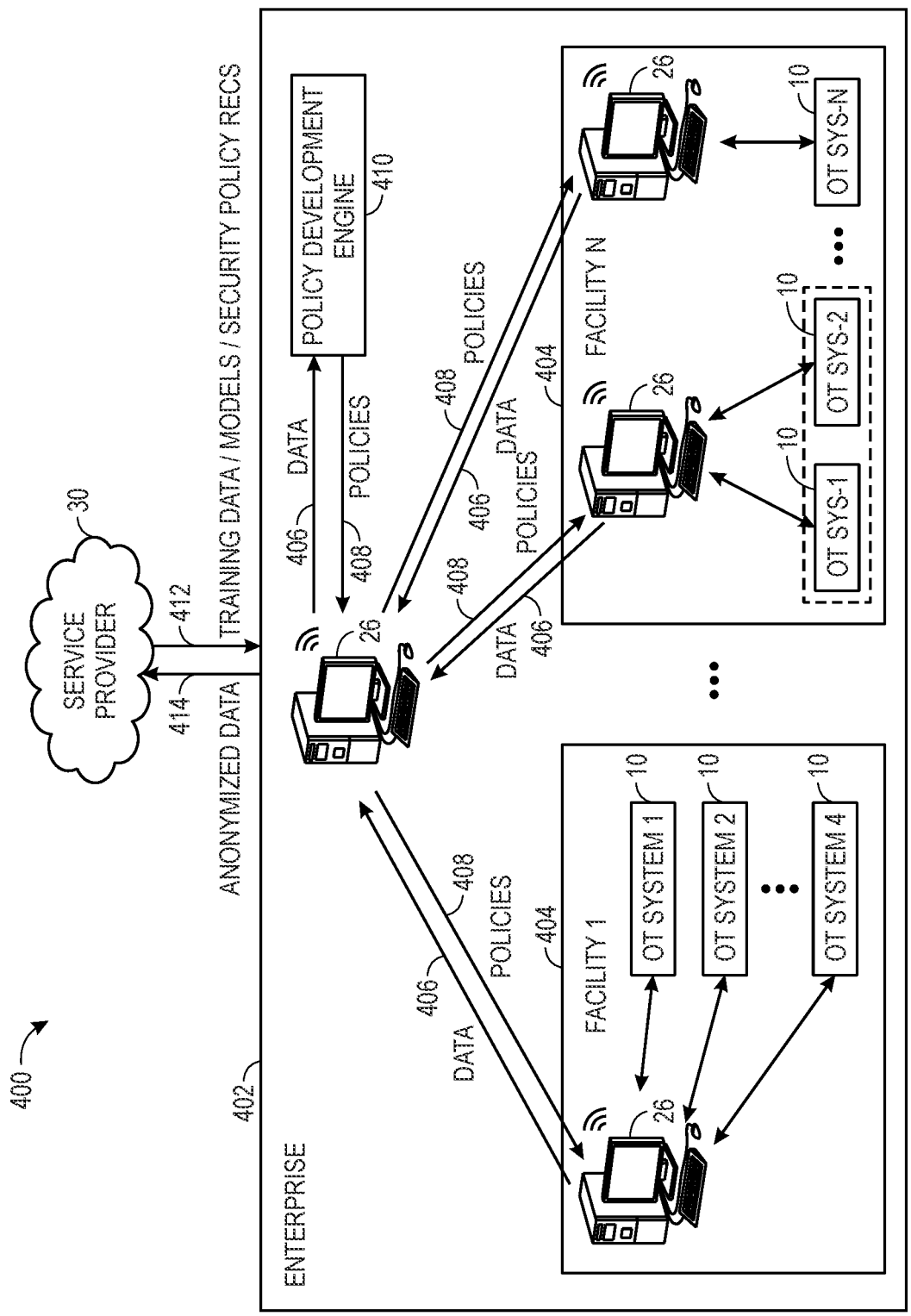
FIG. 5 is a schematic illustrating an architecture for managing policies within an enterprise, in accordance with embodiments presented herein.

FIG. 5 illustrates a schematic of an architecture 400 for managing policies within an enterprise 402. As shown, the enterprise 402 may operate multiple facilities 404, each having one or more industrial automation systems 10, managed by one or more computing devices 26. Operations of each facility 404 may be managed by one or more computing devices 26 that may be on premises at the facility or located remote from the facility 404. Though not shown, in some embodiments, some facilities 404 may be further subdivided into areas having one or more industrial automation systems 10 under the control of a respective management system (e.g., a computing device 26 running control software). The industrial automation systems 10 may be disposed behind firewalls and/or within private networks defined by one or more firewalls. A single private network may encompass an entire facility 404, an area of a facility 404 that includes one or more industrial automation systems 10, or individual industrial automation systems 10 within a facility 404, or spanning multiple facilities 404. One or more computing devices 26 disposed throughout the enterprise 402, may run software for managing operations of the enterprise 402.

For example, a user may utilize a policy management tool to manage policies for the entire enterprise 402. That is, the policy management tool may be utilized to create new policies, edit existing policies, remove existing policies, activate policies, schedule policy activation, deactivate policies, deploy specific policies to specific facilities 404, areas, industrial automation systems 10, and/or devices operated by the enterprise, and/or make adjustments to how policies are enforced throughout the enterprise 402. In some embodiments, policies may only be managed downstream of where the policy management tool is instantiated. For example, a user accessing the policy management tool may be able to manage policies for the entire enterprise 402, whereas a user accessing the policy management tool at Facility 1 may be able to manage policies within Facility 1, but may not be authorized to manage policies for Facility N. Similarly, a user accessing the policy management tool via Facility N may only be able to manage policies for the industrial automation systems 10 that are within the facility 404 (e.g., OT SYS-1 and OT SYS-2, but not OT SYS-N). However, in other embodiments, authority to manage policies within an enterprise 402 may be determined based on other factors, such as authority granted to specific users or user profiles, the type of policies to be managed, components affected by changes, etc.

Computing devices 26 within the enterprise 402 that run the policy management tool may act as enforcement points for policies or otherwise facilitate enforcement of policies within the enterprise 402. For example, if a user makes a modification to a policy, the modification is reflected in the other instantiations of the policy management tool throughout the enterprise 402 such that Facility 1 may make sure that the policy is enforced as modified by the industrial automation systems 10 within the facility 404. However, it should be understood that computing devices 26 running the policy management tool may not be the only enforcement points within an enterprise 402. Indeed, other devices, such as edge devices, firewalls, controllers, and even industrial automation systems 10 themselves may act as policy enforcement points.

The policy management tool may also be used to analyze collected data to develop new policies and/or modifications to existing policies. In some embodiments, the collected data may be discovery data and/or network topology data that may be analyzed to determine characteristics of the OT network and, in some embodiments, generate visualizations (e.g., network maps) of the OT network. Specifically, characteristic information (e.g., IP addresses, MAC addresses, serial numbers, etc.) may be used to identify and/or characterize components that appear in data until a topology (e.g., map) of the whole OT network can be generated. In such embodiments, the data may include a manufacturer name, a product name, a model name, a model number, a serial number, a firmware version, a software version, a port status, captured network traffic, Common Industrial Protocol (CIP) discovery data, link layer discovery protocol (LLDP) data, network traffic data, Open Platform Communications Unified Architecture (OPC-UA) data, and so forth. Data 406 may also be collected from the industrial automation systems 10 in a facility 404 during operation. The collected data may include, for example, design artifacts, help ticket data, incident data, vulnerability data, network traffic data, captured network traffic (e.g., data packets), device logs, data received from one or more service providers, notes provided by an operator, software/firmware update data, warning data, error code data, operational data, temperature data, pressure data, speed/rotation data, quality control data, and so forth. Design artifacts and/or operational data 406 may be aggregated and used to generate recommended policies 408 or modifications to existing policies (e.g., via a policy development engine 410). The recommended policies 408 are implemented and/or enforced (e.g., via one or more policy enforcement points) within the enterprise 402 and/or distributed to the facilities 404 or particular industrial automation systems 10 within the enterprise 402. Once policies 408, or updates to policies, have been implemented and/or enforced, new data 406 may be collected and used to retrain and/or refine the policy development, or to evaluate revised policies 408.

Though the embodiment shown in FIG. 5 uses the computing device 26 at the enterprise level to aggregate data 406, interface with or run the policy development engine 410, and implement, enforce, and/or disseminate policies 408, it should be understood that embodiments are envisaged in which computing devices at the facility, system, or device level performs these functions. That is, aggregating data 406, running the policy development engine 410, and implementing/enforcing policies 408 may be performed at various levels of an enterprise's structure (e.g., the device level, the system level, the facility level, the enterprise level, one or more intermediate levels, or distributed among multiple levels).

In some embodiments, the policy development engine 410 may be run on an edge device in an OT network. In such embodiments, the edge device may receive design artifacts and/or run-time data 406 from one or more devices on an OT network, input the received data to a policy development engine 410 running on the edge device, and generate a set of recommended policies, which may be automatically implemented/enforced, presented to a user for approval, presented to a user for consideration, or some combination thereof, via the policy management tool. The policy development engine 410 may run on a processor of the edge device within an operating system, or the policy development engine 410 may run in a container that is managed by the container orchestration system 222 of FIGS. 3 and 4 (e.g., Docker, KUBERNETES®) instead of, or in addition to, the edge device. As previously described, the container orchestration system may operate in an IT environment and may include a cluster of multiple computing devices that coordinates an automatic process of managing or scheduling work of individual containers (e.g., operating system level virtualization) for applications within the computing devices of the cluster. In other words, the container orchestration system may be used to automate various tasks at scale across multiple computing devices.

In some embodiments, the enterprise 402 may purchase or subscribe to services 412, such as machine learning models, training data for training machine learning models, and/or recommended policies to the enterprise 402, provided by a service provider 30. In some embodiments, the enterprise may collect data 414 to transmit to the service provider 30 that provides some information about the effectiveness of the policies deployed within the enterprise 402. Accordingly, the service provider 30 may use data 414 collected from one or more customer enterprises 402 to improve machine learning models and/or the training data provided to the enterprises 402. Customers may choose to opt in or opt out of providing data 414 to the service provider 30. In some cases, because enterprises may be hesitant to share data, data may be anonymized, masked, pseudonymized, generalized, or otherwise scrubbed before being transmitted to the service provider. For example, characteristic data elements (e.g., names, addresses, IP addressed, MAC addresses, phone numbers, network names, passwords, employee names, employee numbers, employee information, etc.) within the data 414 may be identified and removed and/or changed before being transmitted. Further, data elements related to industrial processes, settings of the industrial automation systems, set points, trade secrets, intellectual property, or other proprietary information may be identified and removed or changed before being transmitted. Further, the service provider 30 may take additional steps to secure the data received by the enterprise 402, such as using a secure communication channel, encrypting data for transmission, encrypting data for storage, and so forth.

As OT systems 10 become more connected and complex, policy management may become more dynamic, resulting in more frequent changes to policies. For example, as shown in FIG. 5, an enterprise 402 may use a service provider 30 to provide suggestions 412 for how to improve its operations and/or run more efficiently, notifications about possible security vulnerabilities for the enterprise, and so forth. Further, software updates, firmware updates, new hardware, changes to industry standards, changes to laws/regulations, etc. may lead an enterprise to implement new policies or modify existing policies frequently to better fit the changing environment. However, given the size and complexity of modern OT systems 10, policy updates may be received, processed, and implemented by different devices within a network at different times, resulting different devices within a network attempting to implement different policies at the same time. For example, if a policy is deployed stipulating that all transmitted data is to be encrypted, a first device may receive and implement the policy faster than a second device such that at a given moment in time the first device may transmit encrypted data while the second device transmit unencrypted data, resulting in problems for a third device interpreting encrypted data from the first device and unencrypted data from the second device. Such transition periods in which devices on the network are enforcing or adhering to different/conflicting policies may result in network vulnerabilities, down time, and/or outages while all of the devices on the network receive and implement the policy update.

Figure 6:
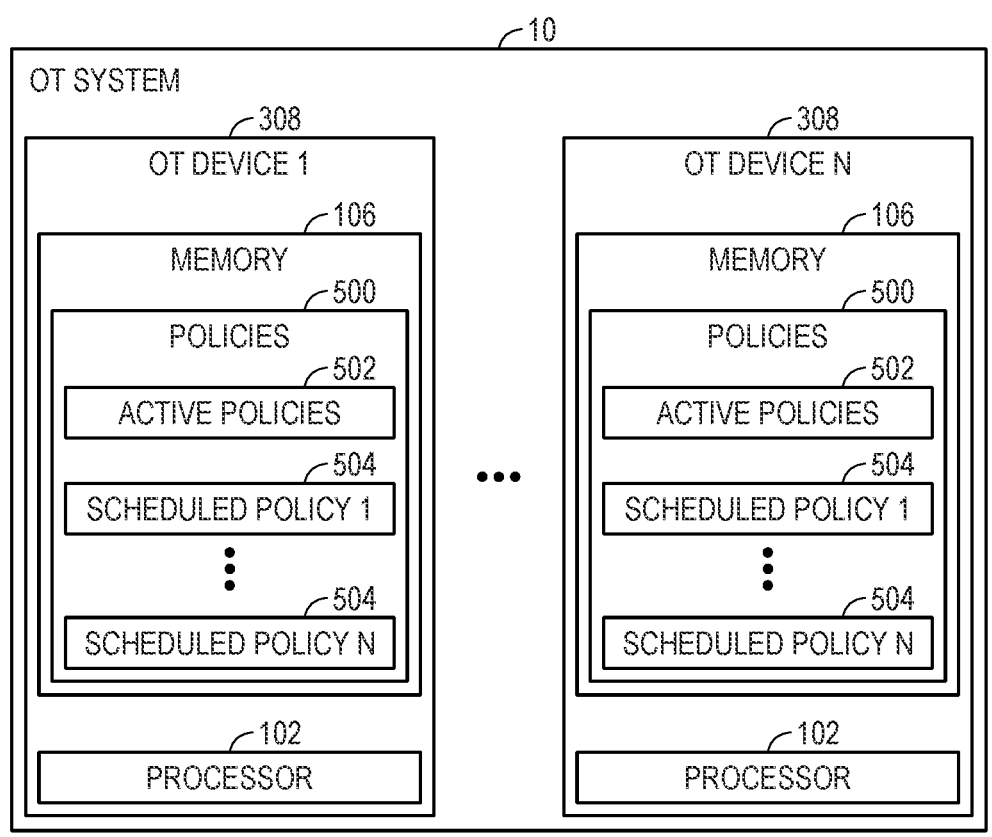
FIG. 6 is a schematic of an OT system that is configured to perform a scheduled policy deployment.

Accordingly, the present techniques are directed to scheduled deployment of policies within an OT network such that enforcement of a new policy starts at the same time across the OT network, thus reducing the transition period during which different devices in the OT network are enforcing or otherwise adhering to different and/or conflicting policies. FIG. 6 is a schematic of an OT system 10 configured to perform scheduled deployment of policies and/or policy updates. As shown, the OT system 10 includes one or more OT devices 308. The OT devices 308 may include motor control centers, motors, HMIs, operator interfaces, contactors, starters, sensors, drives, relays, protection devices, switchgear, compressors, network switches (e.g., Ethernet switches, modular-managed, fixed-managed, service-router, industrial, unmanaged, etc.), edge devices, mixers, machine conveyors, tanks, skids, specialized original equipment manufacturer machines, scanners, gauges, valves, flow meters, and the like. Each of the OT devices 308 may include a memory 106 and a processor 102. Though not shown, it should be understood that the OT devices 308 may include other components, such as communication circuitry (e.g., network interface), a power source, a user interface, input structures, sensors, actuators, etc.

The memory 106 of each OT device 308 may include volatile and non-volatile memory. The memory 106 may be configured to store policies 500, which may include one or more active policies 502 and one or more scheduled policies 504. Though not shown, the memory 106 may also store various other data, such as operational data, configuration data, synchronization data, user profile data, system data, sensor data, databases and/or database tables, routines, control programs/files, instructions defining applications, programs, algorithms, scripts, machine learning models, and so forth.

The policies 500 may be defined as a set of two or more settings that set forth how the OT device 308 is configured, how the OT device 308 operates, and/or how the OT device may be accessed. For example, policies 500 may dictate network addresses, how network addresses are assigned, allowed communication ports, allowed operational parameters, allowed configuration settings, groups of allowed settings during operation, who is allowed to access what devices, etc. Policies 500 may be defined by text, scripts, portions of code, and so forth. The policies may be written directly by a user (e.g., a control engineer), or generated based on inputs provided by a user (e.g., via a graphical user interface). In some embodiments, policies 500 may be generated on or by the OT device 308, whereas in other embodiments, policies 500 may be generated on a different device (e.g., a computing device) and provided to the OT device 308 (e.g., as a patch or a policy update) through the IT/OT network (e.g., via a policy management tool). Accordingly, in some embodiments, policies 500 may be defined and deployed within an OT network in bulk, cross-checked at the system level, deployed, and only accessible by authorized parties. In other embodiments, policies may be defined and deployed with specific OT devices 308 in mind. For larger enterprises, policies may be defined by control engineers and then loaded onto OT devices by OT administrators.

The active policies 502 are stored in memory 106 and are the policies that are actively enforced by the OT device 308. Accordingly, the active policies 502 may be stored in the memory 106 separate from (e.g., different partition or different memory all together) the scheduled policies 504, or may be otherwise distinguished from the scheduled policies 504 using tags, labels, flags, and so forth. During enforcement of the active policies 502, the OT device 308 may receive data indicative of an event to which the OT device 308 may respond. The event may be, for example, a request for access, a request for data, instructions to change configurations or settings, and so forth. The OT device 308 may receive and process the received data and then reference the active policies 502 to determine what action, if any, should be taken. For example, if the event is a request for access to the OT device 308, the OT device may determine whether the active policies 502 authorize access to the requesting device and then allow or deny access based upon the active policies 502.

The scheduled policies 504 are also stored in memory 106, but are not actively enforced by the OT device 308. As previously discussed, the scheduled policies 504 may be stored in the memory 106 separate from (e.g., different partition or different memory all together) the active policies 502, or may be otherwise distinguished from the active policies 502 using tags, labels, flags, and so forth. As with the active policies 502, scheduled policies 502 may be defined by text, scripts, portions of code written directly by a user (e.g., a control engineer), generated based on inputs provided by a user (e.g., via a graphical user interface), by the OT device 308, or by a different device (e.g., a computing device) and provided to the OT device 308 (e.g., as a patch or a policy update) through the IT/OT network (e.g., via a policy management tool). As with the active policies 502, the scheduled policies 504, once implemented, may dictate how the OT device 308 responds to events (e.g., requests for access, requests for data, instructions to change configurations or settings, etc.) and/or received data. Accordingly, once implemented, the scheduled policy may become an active policy 502.

The scheduled policies 504 may include both a definition of a policy, as well as information regarding implementation of the scheduled policies 504. For example, the scheduled policies 504 may identify an implementation trigger that causes implementation of the scheduled policy 504 (e.g., the scheduled policy 504 becomes an active policy 502). The trigger may include, for example, a time of implementation, receipt of a trigger message, a condition, a state, etc., or some combination thereof. For example, the trigger may be the completion of a batch, completion of a process, completion of a shift, entry into a stand-by mode, entry into a safe mode, entry into a maintenance/service mode, and so forth. Further, in some embodiments, the scheduled policies 504 may include or accompany synchronization data to make sure that the clocks of the devices on the OT networks are synchronized such that clocks times are consistent across the OT network. In other embodiments, the trigger may include multiple elements, such as a trigger message received or a condition or state detected after some moment in time or after some period of time has elapsed. In other embodiments, the trigger may be some period of time elapsing after a message is received or some condition or state is detected.

Though FIG. 6 shows the scheduled policies 504 being implemented by an OT device 308, it should be understood that embodiments are envisaged in which scheduled policies 504 are implemented via OT control systems, edge devices, computing devices, containers, tablets, mobile devices, human-machine interfaces, etc. Accordingly, the embodiment shown in FIG. 6 is not intended to be limiting.

Figure 7:
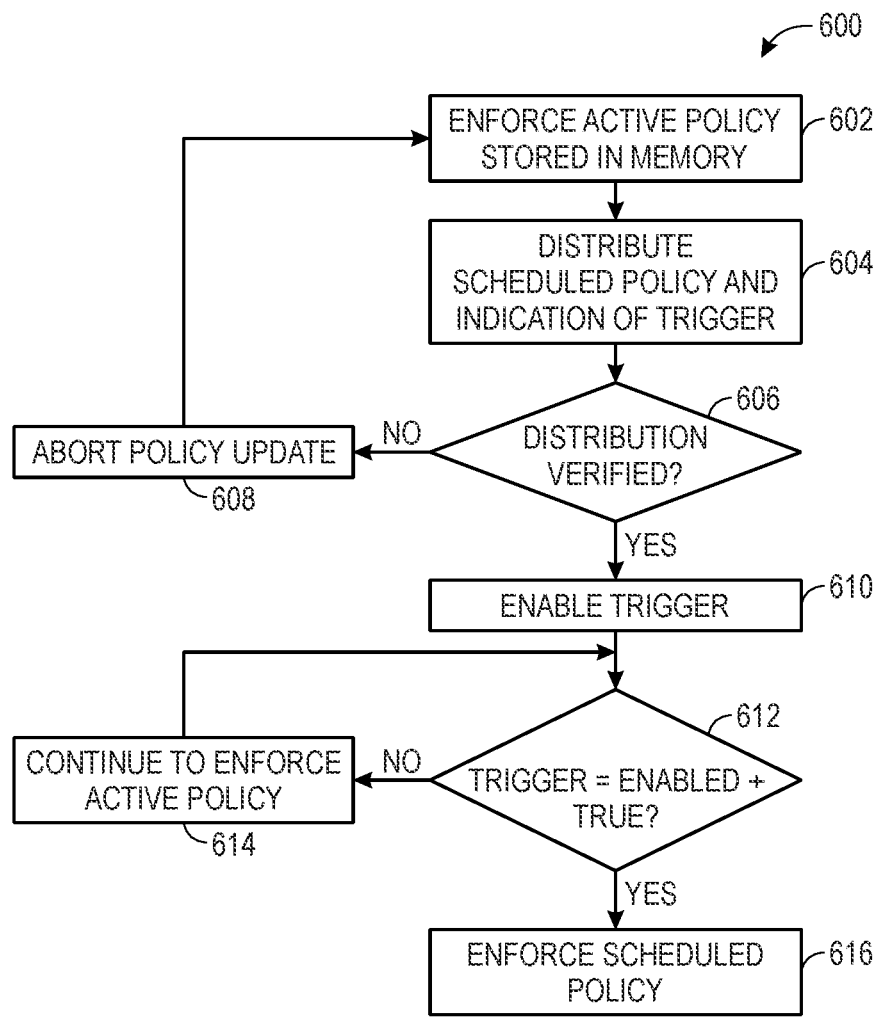
FIG. 7 is a flow chart of a process for coordinating scheduled policy deployment in the OT system of FIG. 6.

FIG. 7 is a flow chart of a process 600 for scheduled policy deployment within OT networks from the perspective of a policy distribution device (e.g., an edge device, a computing device running a policy management tool, etc.). At block 602, the process 600 enforces one or more active policies stored in memory. Policy distribution devices may or may not enforce policies themselves. The active policies define settings, guidelines, and/or rules that define various aspects of how OT devices are to be configured and operate. Accordingly, the OT device may reference the active policies at decision points to determine how to respond to events that occur. Active policies may govern, for example, access and use of an organization's OT assets (e.g., industrial automation devices associated with OT machines). For example, the process 600 may receive data indicative of an event. The event may be anything that may trigger a response from the OT device. For example, the event may include a request for access, a request for data, instructions to change configurations or settings, and so forth. In response, the process 600 may identify an action to take in response to the event based on the one or more active policies being enforced. For example, the process 600 may receive and process the received data and then reference the active policies to determine what action, if any, should be taken. For example, if the event is a request for access to the OT device, the process 600 may determine whether the active policies authorize access to the requesting device and then allow or deny access based upon the active policies. In some embodiments, the identified action may be to take no action.

At block 604, the process distributes a scheduled policy and an indication of a trigger to devices within the OT network. For example, the trigger may be a time of implementation (e.g., an activation timestamp), receipt of a trigger message, or a state/condition that, when detected, causes implementation of the scheduled policy. In some embodiments, if the indication of the trigger identifies a time at which to implement the policy, the indication of the trigger may include synchronization data (e.g., assignment of a central time, or a central time master to specify a reference time) in order to synchronize the clocks of the devices receiving the scheduled policy and the indication of the trigger such that the scheduled policy is implemented at the same time across the network.

At decision 606, the process communicates with the devices to which the scheduled policy was distributed to verify receipt of the scheduled policy. In some embodiments, the devices may merely confirm that the scheduled policy was received. In other embodiments, the devices may analyze the received scheduled policy and confirm that they are capable of implementing the scheduled policy. In some embodiments, the devices may verify the authenticity of the scheduled policy (e.g., checking hash codes, keys, etc.) and/or intent to implement the scheduled policy.

If the distribution of the scheduled policy is not verified by all receiving devices, the process 600 proceeds to block 608 and aborts the policy update. In some embodiments, a notification or alert may be generated. In such cases, the process may return to block 602 and continue to enforce the existing active policies.

If the distribution of the scheduled policy is verified by all receiving devices, the process 600 proceeds to block 610 and enables the trigger. Enabling the trigger may include, for example, communicating to the devices implementing the policy that the trigger has been enabled and the policy is ready for implementation. In some embodiments, enabling the trigger may be like arming the system for deployment of the scheduled policy. Accordingly, the devices may wait until the trigger, or a trigger condition, is true to deploy the scheduled policy.

At decision 612, the process 600 determines whether the trigger is both enabled and true. If the trigger is not both enabled and true, the process 600 proceeds to block 614 and continues to enforce the active policy. If the process 600 determines that the trigger is both enabled and true, the process 600 proceeds to block 616 and enforces the scheduled policy. In some embodiments, if the trigger is a particular time, a particular amount of time elapsing, and/or detection of some condition or state, the process 600 may wait until the particular time has arrived, the particular amount of time has elapsed, and/or the condition or state has been detected in order to enforce the scheduled policy. However, in other embodiments, the trigger may be a communication (e.g., a network message instructing the devices to implement the scheduled policy). In such embodiments, the trigger enablement message may also act as the trigger message. However, in other embodiments, the trigger message may proceed the trigger enablement message. In some embodiments, multiple triggers may be used in combination, or a trigger may involve multiple conditions.

Figure 8:
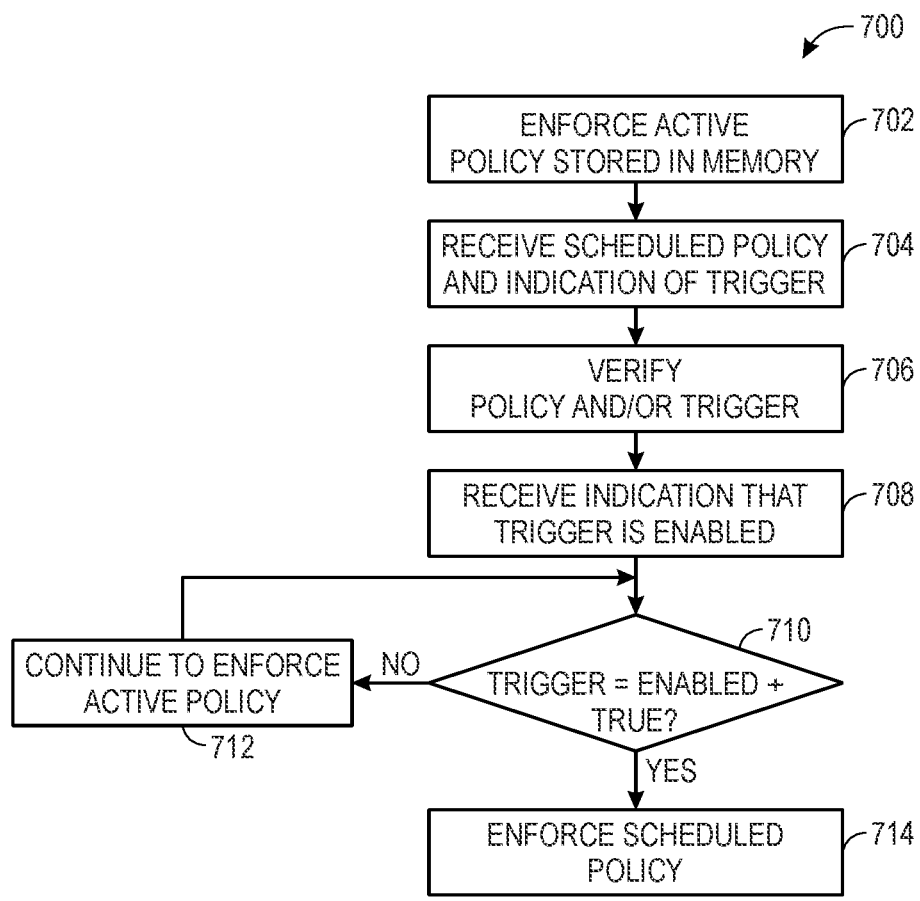
FIG. 8 is a flow chart of a process for scheduled policy deployment from the perspective of a device in the OT system of FIG. 6.

FIG. 8 is a flow chart of a process 700 for scheduled policy deployment within OT networks from the perspective of a device receiving and implementing the policy. At block 702, the process 700 enforces one or more active policies stored in memory. The active policies define settings, guidelines, and/or rules that define various aspects of how OT devices are to be configured and operate. Accordingly, the OT device may reference the active policies at decision points to determine how to respond to events that occur. Active policies may govern, for example, access and use of an organization's OT assets (e.g., industrial automation devices associated with OT machines). For example, the process 700 may receive data indicative of an event. The event may be anything that may trigger a response from the OT device. For example, the event may include a request for access, a request for data, instructions to change configurations or settings, and so forth. In response, the process 700 may identify an action to take in response to the event based on the one or more active policies being enforced. For example, the process 700 may receive and process the received data and then reference the active policies to determine what action, if any, should be taken. For example, if the event is a request for access to the OT device, the process 700 may determine whether the active policies authorize access to the requesting device and then allow or deny access based upon the active policies. In some embodiments, the identified action may be to take no action.

At block 704, the process 700 receives a scheduled policy and an indication of a trigger. The scheduled policy and the indication of the trigger may be stored in memory. At block 706, the process 700 verifies the scheduled policy and the indication of the trigger. Verification may include, for example, confirming receipt of the scheduled policy and the indication of the trigger. In other embodiments, the process 700 may analyze the received scheduled policy and/or indication of the trigger to confirm that the device is capable of implementing the scheduled policy. In some embodiments, the process 700 may verify the authenticity of the scheduled policy (e.g., by checking hash codes, keys, etc.) and/or intent to implement the scheduled policy. In some embodiments, verification may be performed in response to a request from the device(s) distributing the scheduled policy and the indication of the trigger. In other embodiments, verification may be performed in response to receiving the scheduled policy and the indication of the trigger, or without verification being prompted/requested.

A block 708, the process 700 receives an indication that the trigger has been enabled. The indication may be a network message, a change to a tag or flag, and so forth. In some embodiments, the indication may include communication indicating that the trigger has been enabled and the policy is ready for implementation. In this way, enabling the trigger may be like arming the system for deployment of the scheduled policy. Accordingly, the devices may wait until the trigger, or a trigger condition, is true to deploy the scheduled policy.

At block 710, the process 700 determines whether the trigger is both enabled and true. If the trigger is not both enabled and true, the process 700 proceeds to block 712 and continues to enforce the active policy. If the process 700 determines that the trigger is both enabled and true, the process 700 proceeds to block 714 and enforces the scheduled policy. As previously described, if the trigger is a particular time, a particular amount of time elapsing, and/or detection of some condition or state, the process 700 may wait until the particular time has arrived, the particular amount of time has elapsed, and/or the condition or state has been detected in order to enforce the scheduled policy. However, in other embodiments, the trigger may be a communication (e.g., a network message instructing the devices to implement the scheduled policy). In such embodiments, the trigger enablement message may also act as the trigger message. However, in other embodiments, the trigger message may proceed the trigger enablement message. In some embodiments, multiple triggers may be used in combination, or a trigger may involve multiple conditions.

The present disclosure is directed to techniques for scheduled policy deployment in an OT network in order to reduce or eliminate an amount of time during which different devices in the OT network apply conflicting policies. Specifically, a scheduled policy and an indication of a trigger for implementing the scheduled policy may be distributed to one or more OT devices in an OT network. The OT devices may verify the received policy. Verification may include, for example, confirming receipt of the scheduled policy, determining that the OT device is capable of enforcing the policy, verifying authenticity of the scheduled policy. Further, in some embodiments, synchronization data may be transmitted to OT devices to synchronize clocks of the OT devices. Messages may be transmitted to the OT devices that the trigger is enabled. Upon determination that the trigger is enabled and that the trigger is true, the OT devices may begin enforcing the scheduled policy. The trigger may be receipt of the indication that the trigger is enabled, passage of a particular moment in time, a state or condition being detected, a network message being received (e.g., instructions to enforce the scheduled policy), or any combination thereof. Technical effects of using the present techniques include reduced network vulnerabilities, down time, and/or outages that may be caused by OT devices in an OT network enforcing different/conflicting policies. Further, use of the disclosed techniques may allow for more predictable and smoother deployment of new policies within an OT network.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An operational technology (OT) device, comprising:
a processor; and
a memory, accessible by the processor, the memory storing:
 a first policy comprising a first set of settings associated with operation of the OT device of one or more the OT devices in an industrial automation system over an OT network, wherein the first set of settings correspond to one or more first provisions that govern management of the OT device; and
 instructions that, when executed by the processor, cause the processor to perform operations comprising:
 operating the OT device based on the first set of settings;
 receiving, from a control system disposed in an industrial automation system, a second policy different from the first policy and an indication of a trigger, wherein the second policy comprises a second set of settings associated with the operation of the OT device, wherein the second set of settings correspond to one or more second provisions that govern management of the OT device, and wherein the control system is configured to transition the one or more OT devices from enforcing the first policy to enforcing the second policy;
 transmitting a message to the control system indicating that the second policy has been verified:
 receiving from the control system an indication that the trigger is enabled;
 determining by the OT device that the trigger is true; and
 in response to the receiving the indication that the trigger is enabled and the determining that the trigger is true, operating the OT device based on the second set of settings.

2. The OT device of claim 1, wherein operating the OT device based on the first set of settings comprises:
receiving, from an additional OT device, data associated with an event;
identifying an action in response to the event based on the first policy, wherein the first policy indicates the additional OT device as trusted; and
performing the identified action comprising operating the OT device based on the data.

3. The OT device of claim 2, wherein operating the OT device based on the second set of settings comprises:
receiving second data associated with a second event;
identifying a second action in response to the second event based on the second policy; and
performing the identified second action.

4. The OT device of claim 1, wherein the operations comprise verifying the second policy, wherein verifying the second policy comprises confirming receipt of the second policy and the indication of the trigger, determining that the OT device is capable of operating based on the second set of settings, or verifying an authenticity of the second policy, or any combination thereof.

5. The OT device of claim 1, wherein the operations comprise:
receiving synchronization data from the control system; and
synchronizing a clock of the OT device to a clock of the control system based on the synchronization data.

6. The OT device of claim 1, wherein the trigger comprises passage of a particular moment in time.

7. The OT device of claim 1, wherein the trigger comprises a state or condition being detected.

8. The OT device of claim 1, wherein the trigger comprises receipt of the indication that the trigger is enabled.

9. The OT device of claim 1, wherein operating the OT device based on the second set of settings comprises operating the OT device based on the second set of settings and the first set of settings.

10. An edge device configured to be disposed within an operational technology (OT) network of an industrial automation system, comprising:
a processor; and
a memory, accessible by the processor, the memory storing:
a policy comprising a set of settings associated with operation of one or more OT devices within the OT network, wherein the set of settings correspond to one or more provisions that govern management of at least one OT device of the one or more OT devices;
an indication of a trigger for implementing the policy; and
instructions that, when executed by the processor, cause the processor to perform operations comprising:
transmitting, to a first OT device of the one or more OT devices within the OT network, the policy and the indication of the trigger;
receiving, from the first OT device, verification of the policy and the indication of the trigger; and
transmitting, to the first OT device, an indication that the trigger is enabled, wherein in response to the receiving the indication from the edge device that the trigger is enabled and a determination by the first OT device that the trigger is true, the first OT device is configured to begin, as part of a transition in the OT network from enforcing an additional policy to enforcing the policy, operating based on the set of settings of the policy.

11. The edge device of claim 10, wherein the verification of the policy and the indication of the trigger comprises confirmation of receipt of the policy and the indication of the trigger, confirmation of a determination that the first OT device is capable of operating based on the set of settings, or confirmation of an authenticity of the policy, or any combination thereof.

12. The edge device of claim 10, wherein the operations comprise transmitting, to the first OT device, synchronization data, wherein the synchronization data is configured to synchronize a clock of the first OT device to a clock of the processor.

13. The edge device of claim 10, wherein the trigger comprises receipt of the indication that the trigger is enabled.

14. The edge device of claim 10, wherein the trigger comprises passage of a particular moment in time.

15. The edge device of claim 10, wherein the trigger comprises a state or condition being detected.

16. The edge device of claim 10, wherein the processor is configured to receive the policy from a container orchestration system, and wherein the container orchestration system is configured to generate the policy based on executing a policy development engine in a container.

17. A method, comprising:
receiving, from a first operational technology (OT) device of one or more OT devices in an industrial automation system over an OT network, first data associated with a first event;
identifying a first action in response to the first event based on a first policy, wherein the first policy comprises a first set of settings associated with operation of a second OT device different from the first OT device, and wherein the first set of settings correspond to one or more first provisions that govern management of the second OT device;
performing the identified first action to operate the second OT device based on the first data;
receiving, from a control system disposed in the industrial automation system, a second policy different from the first policy and an indication of a trigger condition, wherein the second policy comprises a second set of settings associated with the operation of the second OT device, wherein the second set of settings correspond to one or more second provisions that govern management of the second OT device, and wherein the control system is configured to transition the one or more OT devices from enforcing the first policy to enforcing the second policy;
verifying the second policy, wherein verifying the second policy comprises confirming receipt of the second policy and the indication of the trigger condition, determining that the second OT device is capable of operating based on the second set of settings, or verifying an authenticity of the second policy, or any combination thereof;
transmitting a message to the control system indicating that the second policy has been verified;
receiving from the control system an indication that the trigger condition is enabled;
determining by the second OT device that the trigger condition is true; and
in response to the receiving the indication that the trigger condition is enabled and the determining that the trigger condition is true, operating the second OT device based on the second set of settings, wherein operating the second OT device based on the second set of settings comprises:
receiving second data associated with a second event;
identifying a second action in response to the second event based on the received second policy; and
performing the identified second action.

18. The method of claim 17, wherein the first event and the second event comprise a request for data, a request for access, a request to install software, or a request to establish a connection, or any combination thereof, and wherein the first policy and the second policy are active policies.

19. The method of claim 17, wherein the trigger condition comprises receipt of the indication that the trigger condition is enabled, passage of a particular moment in time, a state or condition being detected, a network message being received, or any combination thereof.

20. The method of claim 17, wherein the trigger condition corresponds to a completion of a batch, an entry of the second OT device into a mechanical stand-by mode, an entry of the second OT device into a maintenance mode, or any combination thereof.

* * * * *